United States Patent [19]
Zackheim

[11] 3,878,831
[45] Apr. 22, 1975

[54] DISPENSING DEVICE FOR TESTING COWS FOR MASTITIS

[75] Inventor: Eli A. Zackheim, Norwick, Conn.

[73] Assignee: Jules Silver, Norwich, Conn.

[22] Filed: June 20, 1974

[21] Appl. No.: 481,548

[52] U.S. Cl. ................................. 128/2 F; 23/258
[51] Int. Cl. ............................................. A61b 10/00
[58] Field of Search ............... 128/2 F; 23/231, 258; 222/211; 141/114, 266, 237, 388

[56] References Cited
FOREIGN PATENTS OR APPLICATIONS
428,073  5/1935  United Kingdom ................... 23/258

Primary Examiner—Stanley H. Tollberg
Assistant Examiner—Norman L. Stack, Jr.

[57] ABSTRACT

A dispensing device, particularly for use in testing cows for mastitis, is adapted to be secured to the open neck of a flexible container having a supply of teat testing or treating liquid therein and consists of a plurality of independent upwardly opening cups connected to centrally located means for securing the cups to the open neck of the container. A conduit having a bore therein extends through the centrally located means and includes a free end located at an elevation above the cups. The conduit has at least one recess formed on its exterior surface and is surrounded by a cap at its free end, thereby to provide a path between the conduit and the cap for liquid in the container forced through the bore of the conduit by squeezing pressure. A plurality of channels extend from the conduit to the cup to receive this liquid and direct it into the respective cups. The flexible container, in addition to holding the reagent, also acts as a handle for the dispensing device attached to it.

12 Claims, 3 Drawing Figures

PATENTED APR 22 1975 3,878,831
SHEET 1 OF 2

DISPENSING DEVICE FOR TESTING COWS FOR MASTITIS

BACKGROUND OF THE INVENTION

The present invention relates to dispensers and, more particularly, to a dispensing device for use with a flexible container, which device is adapted to receive and retain liquid expelled from the container upon squeezing.

Flexible wall containers attached or fitted with dispensers have been previously proposed in the prior art for a number of various uses. Typically the dispensers are used for measuring a quantity of liquid dispensed from the flexible wall container upon squeezing. It has been found that dispensers of this type can be advantageously used in connection with disease prevention in the dairy industry. For example, one method of disease prevention is carried out by means of teat dipping with a bacterial control solution, particularly for the prevention of mastitis in dairy cows. In addition, it has been found that by the application of certain types of reagents to cow's milk, a reaction with the reagent will form; for example a change of color, or texture of the reagent will occur or a precipitate will form, thereby giving an indication of whether or not the cow's teat is infected with mastitis.

Heretofore, teat dipping or testing was performed by physically pouring a supply of the dipping solution or reagent into a separate cup or container into which the farmer then dipped the cow's teats or placed cow's milk. When testing of cow's teats is involved, it is desirable to test milk from all four teats at once with the reagent solution, and thus usually more than one cup is provided.

Typically dispensers for these purposes must be inexpensive to manufacture in order that they be provided to the user at minimum cost and the dispensers must be designed to permit the insertion of the teat into the well or cup quickly and easily so that the dipping or testing operation can be carried out rapidly. Moreover, the dispenser must be designed so that the treating solution will not be spilled or lost in transferring it from the container to the dispenser or, where separate containers, cups or wells are used for each teat during testing, so that the solution from one well does not contaminate the solution from another well.

Accordingly, it is an object of the present invention to provide a dispensing device or flexible wall container which is adapted to perform the above described treating and testing operations.

It is another object of the present invention to provide a dispensing device which is adapted to supply solution for teat dipping or treating while providing a substantially unobstructed opening to accommodate the teat.

Another object of the present invention is to provide a dispensing device by which all four teats of a cow can be treated or tested simultaneously with solutions supplied from a common source.

A further object of the present invention is to provide an improved dispenser which is particularly suited for use with flexible wall containers.

A still further object of the present invention is to provide a dispensing device which is relatively simple in construction and which is readily usable for teat dipping and testing.

SUMMARY OF THE INVENTION

In accordance with one aspect of the present invention, an open top dispensing device which is adapted to be secured to the open neck of a flexible container having a supply of teat dipping or teating solution therein includes a plate like structure adapted to be molded as a single piece of plastic material having centrally located means integrally formed therewith for securing the plate structure to the open neck of the container. This latter means may take the form of a threaded annular ring corresponding to a cap for a bottle. The plate has a plurality, preferably four, open top cups formed therein about the centrally located means, which cups define wells that are adapted to contain a liquid.

A conduit is integrally formed with the plate and extends through the centrally located means to a free end located at a position above the plate. This conduit has a bore therein to permit passage of liquid from the container upon the application of a squeezing force thereto. The cap also has a recess formed on its exterior surface, above the plate, which is surrounded by a cap that defines a flow path for the liquid from the bore of the conduit towards the plate. The latter includes a plurality of independent channels which extend from the conduit to the respective cups, in order to distribute fluids discharged through the conduit along said path into the cups. The above, and other objects, features and advantages of the present invention, will be apparent in the following detailed description of an illustrative embodiment thereof which is to be read in connection with the accompanying drawings, wherein:

DESCRIPTION OF THE ILLUSTRATED EMBODIMENT

Figures 1, 2:
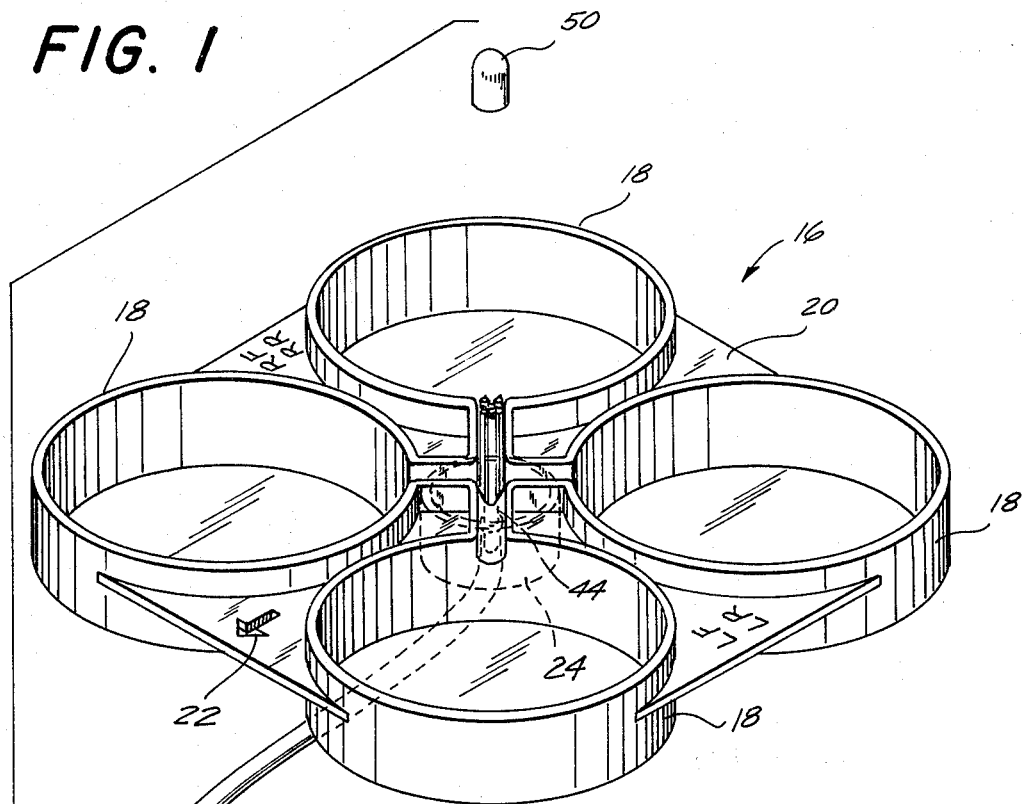
FIG. 1 is a perspective view of a liquid dispenser device constructed in accordance with the present invention and adapted to be mounted on a flexible wall container.
FIG. 2 is an enlarged partial perspective view of the conduit portion of the dispenser device shown in FIG. 1.

Referring now to the drawing in detail, and initially to FIG. 1 thereof, it is seen that a flexible container 10 formed of a suitable material such as polyethylene, vinyl, or polyvinyl-chloride, is filled with a suitable liquid, such as a teat dip, or with a comercially available reagent which is useful in testing cow's teats to determine the presence of mastitis in the cow. It will be noted that the container 10 has a low profile which is advantageous in teat dipping since the container is not cumbersome and is easily inserted under the udder of a cow to immerse the teats in the cups of the dispenser, as described hereinafter. The low profile is also advantageous in that it permits the dispenser to be conveniently placed below the cow's udder when taking milk samples for teat testing.

Figure 3:
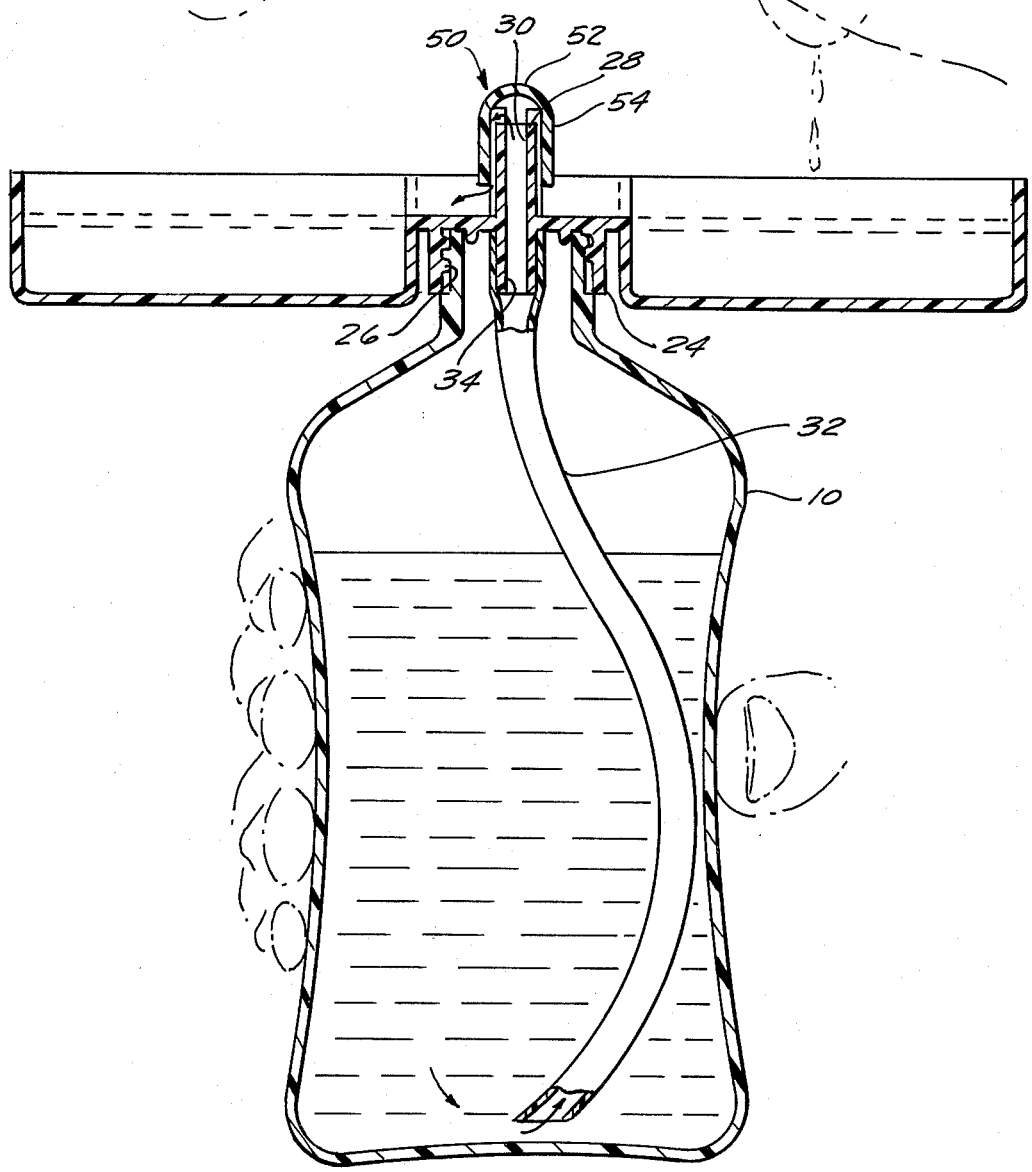
FIG. 3 is an elevational view, in section, of the assembled dispensing device of the present invention.

Container 10 has an open top or neck 12 which includes a set of integrally molded or formed threads 14 on its outer surface. The dispensing device 16 of the present invention is threadedly secured to the neck 14 of the container and is adapted to receive a supply of the liquid in the container, upon squeezing thereof, to make the liquid (as shown in FIG. 3) available for teat dipping or testing. The dispenser is thus securely mounted on the container which then also acts as a handle for holding and supporting the dispenser.

The dispenser device 16, as seen in FIGS. 1 and 3, is integrally molded from a plastic material such as polyethylene or polypropylene and is relatively rigid. Four independent cups or wells 18 are integrally formed in the dispenser 16 in spaced locations to each other in a regular array having a generally square configuration. The cups are each dimensioned, as seen in FIG. 3, to readily accommodate a cow's teat, and are spaced from each other such that all four teats of the cow can be dipped or tested simultaneously.

The cups 18 are interconnected, as seen in FIG. 1, by an integral plate-like element 20 which extends between the cups. The plate is provided with an arrow 22 formed therein and with indicia identifying the cups with respect to the arrow. This is a feature of the invention since, in teat testing, milk from the cow's teats is drawn in the conventional manner by hand, and a stream of milk from each teat is directed to a separate cup 18 (see FIG. 3) so that milk from each teat is separately tested. Thus, in use, the arrow 22 is pointed to the head of the cow, so that the cup marked LF will be used to test the milk from the left front teat of the cow and the other cups to test the milk from the other teats respectively. After the milk has been dropped in the respective cups, the dispenser is removed from below the cow and the user squeezes container 10 to supply reagent from the container to the cups 18 in order to determine which teat, if any, is infected with mastitis. This is done by observing the change, if any, in color or texture of the reagent or the formation of precipitates in the respective cups. This insures that the infected teat is properly identified by the user after the dispenser is removed from the cow.

It is noted that the plate like element 20, i.e., the plastic portions extending between cups 18 can be eliminated if desired, and the device formed simply as a plurality of independent integrally connected cups. In this case the arrow and indicia are either not used or may be placed on the cups themselves.

Dispenser 16 includes a centrally located connector 24 in the form of an annular skirt which extends downwardly between the cups and below the plate 20. The skirt 24 has threads 26 formed on the interior thereof for threadedly engaging the threads 14 on the neck 12 of container 10. The skirt corresponds to a cap for the container 10 and closes the open end of the container, as seen in FIG. 3.

An elongated generally cylindrical conduit 28 is integrally formed in the dispenser 16 and extends axially of the annular skirt 24. Conduit 28 includes an internal bore 30 which provides communication between the interior of container 10 and the upper surface of plate 20 and cups 18. A flexible tube 32 is connected to the lower end 34 of conduit 28, as seen in FIG. 3, and extends into the lower portion of container 10. In this manner, it will be appreciated that upon squeezing of flexible container 10, the liquid within the container will be forced upwardly into tube 32, through the bore 30 of conduit 28.

As shown in FIG. 2, the upper portion 36 of conduit 28 provides a plurality of recesses 38 about the exterior surface of the conduit by means of radially extending ribs 40 formed integrally with the conduit. These ribs extend beyond the top edge 42 of conduit 28.

Ribs 40 are located in a predetermined location in dispenser 16 with respect to individual channels 44 formed in the dispenser and extending between the conduit and the respective cups 18. The channels 44 are generally semicircular in cross section, as seen in FIG. 2, and provide communication for liquid flowing from the conduit to the respective cups. The channels are segregated from one another, so that liquid flowing in one channel will not flow into another channel, by means of extensions 46 formed on the lower portions of the ribs 40, and extending from the ribs to the side walls 48 of the channels 44 at the juncture between channels.

Finally, a flexible cap 50 is fitted over the upper portion 42 of conduit 28 and embraces the ribs 40. The rib ends space the top portion 52 of the cap from the top edge 41 of the conduit, and the side walls 54 of the cap surrounds the ribs above the channels 44. In this manner, a complete flow path for the liquid in container 10 is provided from the interior of the container into the channels 44. Thus it will be appreciated that upon squeezing of the container 10 the liquid in the container will be forced into the flexible tube 32, through the bore 30 of conduit 28, and then against the top 52 of cap 50. At this point the cap deflects the liquid into the separate recesses 38 formed between the ribs 40, and forces the liquid downwardly into the respective channels 44 associated with each of these recesses. From there the liquid flows through the channels into the respective cups 18. Because of this particular construction of conduit 28 and the cap 50, the liquid which is pumped by outside pressure against the flexible wall of the container moves upwardly and is deflected downwardly, insuring that it will be properly deposited into the individual channels 44 and cups 18. Of course, it will be appreciated that in actual operation, by merely squeezing the wall of container 10 any selected number of times the desired amount of liquid can be placed within the respective cups 18 through the flow path which has been described.

As mentioned above, once cups 18 are partly filled, all of the cow's teats can be simultaneously tested with reagent material to determine the presence of mastitis, or they can be treated with a medicament, as desired. Where a reagent is used, after the reagent has contacted the milk from the cow's teats, if mastitis is present the color or texture of the reagent will change or a precipitate will form. Thus, after cow's milk has been deposited in the respective cups, upon removal of the dispenser device from below the cow's teats, the operator can determine which teat is infected by noting the legend on plate 20 associated with the respective cup containing the altered reagent. This insures proper identification of the infected teat and substantially eliminates errors in testing cows for mastitis.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of the invention.

What is claimed is:

1. An open top dispensing device adapted to be secured to the open neck of the flexible container having a supply of liquid therein, said device comprising a plate having centrally located means integrally formed therewith for securing the plate to the open neck of the container and a plurality of open top cups formed therein about said centrally located means and adapted to contain liquid therein; a conduit formed integrally with said plate and extending through said centrally located means to a free end located at a position above the plate, said conduit having a bore therein to permit passage of liquid from said container into said cups; a cap surrounding the free end of the conduit above the plate; said conduit having a recess portion formed therein on its exterior surface above the plate thereby to provide, between the conduit and cap, a path for liquid in the container forced therefrom by squeezing pressure, said cap serving to direct said liquid from the bore of the conduit along said path towards the plate; said plate having a plurality of channels formed therein extending from said conduit to said cups to distribute fluids from said path to said cups.

2. The device as defined in Claim 1 wherein said conduit has a plurality of independent recesses formed on its outer surface respectively associated with said channels and said cup includes a top section spaced from the free end of the conduit and a continuous side wall surrounding said recesses.

3. The device as defined in Claim 2 wherein said conduit has a plurality of generally radially extending ribs formed thereon defining said recesses therebetween on the portion of the conduit above the plate.

4. A dispenser cup defined in Claim 3 including a flexible tube attached to the portion of the conduit below said plate and within said centrally location means, said tube extending into the liquid in said container.

5. The dispenser cup as defined in Claim 1 wherein said open neck of the container is threaded and said centrally located means comprises an annular skirt extending downwardly from said plate and having internal threads formed thereon for threaded engagement with said open neck.

6. A dispensing device adapted to be secured to the open neck of a flexible container having a supply of liquid therein said device comprising a plurality of independent upwardly opening cups, means centrally located between said cups and connected thereto for securing said cups to the open neck of the container; a conduit extending through said centrally located means and having a free end located at an elevation above said cups, said conduit having a bore therein to permit passage of liquid from said container into said cups; a cap surrounding said free end of said conduit; said conduit having a recess formed therein on its exterior surface, therby to provide a path between the conduit and cap for liquid in the container forced therefrom by squeezing pressure; and a plurality of channels extending from said conduit to said cups for receiving liquid from said path and directing it to said cups.

7. The device as defined in claim 6 wherein said cups, conduit and centrally located means are integrally formed as a one piece member.

8. The device as defined in claim 7 wherein said plurality of cups comprise four cups arrayed above said centrally located means and conduit in a square pattern.

9. The device as defined in claim 8 wherein said conduit has a plurality of independent recesses formed on its outer surface respectively associated with said channels and said cap includes a top section spaced from the free end of the conduit and a continuous side wall surrounding said recess.

10. The device as defined in claim 8 wherein said conduit has a plurality of generally radially extending ribs formed thereon defining said recesses therebetween on the portion of the conduit above the cups.

11. The devices as defined in claim 10 wherein said channels are integrally formed between said conduit and said cups and said ribs have extensions connecting them to the sides of their associated channels to separate the channels from one another.

12. The dispenser as defined in claim 8 including indicia on the dispenser representing the front of a cow being tested and milk from the respective teats of the cow.

* * * * *